United States Patent
Matsusue

(10) Patent No.: US 12,516,135 B2
(45) Date of Patent: Jan. 6, 2026

(54) METHOD FOR PRODUCING HYDROXYPROPYL METHYLCELLULOSE ACETATE SUCCINATE

(71) Applicant: Shin-Etsu Chemical Co., Ltd., Tokyo (JP)

(72) Inventor: Shintaro Matsusue, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 470 days.

(21) Appl. No.: 18/302,420

(22) Filed: Apr. 18, 2023

(65) Prior Publication Data

US 2023/0340162 A1 Oct. 26, 2023

(30) Foreign Application Priority Data

Apr. 21, 2022 (JP) ................................. 2022-069797

(51) Int. Cl.
*C08B 3/16* (2006.01)

(52) U.S. Cl.
CPC ...................................... *C08B 3/16* (2013.01)

(58) Field of Classification Search
CPC .................................. C08B 3/16; C08B 13/00
See application file for complete search history.

(56) References Cited

U.S. PATENT DOCUMENTS

| | | | |
|---|---|---|---|
| 10,759,873 B2 | 9/2020 | Petermann et al. | |
| 10,888,525 B2 * | 1/2021 | Matsubara | A61K 31/525 |
| 2016/0347866 A1 | 12/2016 | Petermann et al. | |
| 2021/0130497 A1 | 5/2021 | Kitaguchi et al. | |

FOREIGN PATENT DOCUMENTS

| | | |
|---|---|---|
| EP | 3228324 A1 | 10/2017 |
| EP | 3318283 A1 | 5/2018 |
| EP | 3718538 A1 | 10/2020 |
| JP | 2017505847 A | 2/2017 |
| JP | 2021070789 A | 5/2021 |
| WO | 2015126576 A1 | 8/2015 |

OTHER PUBLICATIONS

"Extended European Search Report for European Application No. 23168636.1, dated Sep. 4, 2023".
Sakellariou, P , et al., "Interactions and partitioning of diluents/plasticizers in hydroxypropyl methylcellulose and polyvinyl alcohol homopolymers and blends. Part II: Glycerol", Colloid & Polymer Science 272(1):48-56 (1994).

* cited by examiner

*Primary Examiner* — Jonathan S Lau
(74) *Attorney, Agent, or Firm* — Myers Bigel, P.A.

(57) ABSTRACT

Provided is a method capable of productively producing, even after reducing the amount of an aliphatic carboxylic acid used, hydroxypropyl methylcellulose acetate succinate (HPMCAS) with an equivalent level of molecular weight as compared to before reducing the amount of the aliphatic carboxylic acid. The production method includes at least an esterification reaction step of obtaining a hydroxypropyl methylcellulose acetate succinate-containing reaction solution by subjecting hydroxypropyl methylcellulose, an acetylating agent and a succinoylating agent to an esterification reaction under the presence of an aliphatic carboxylic acid and a polyalcohol.

5 Claims, 4 Drawing Sheets

METHOD FOR PRODUCING HYDROXYPROPYL METHYLCELLULOSE ACETATE SUCCINATE

STATEMENT OF PRIORITY

This application claims the benefit of priority to Japanese Application No. 2022-069797 filed on Apr. 21, 2022, the contents of which are incorporated herein by reference in entirety.

FIELD OF THE INVENTION

The present invention relates to a method for producing hydroxypropyl methylcellulose acetate succinate.

BACKGROUND OF THE INVENTION

As an enteric polymer, there is widely known hydroxypropyl methylcellulose acetate succinate (also referred to as "HPMCAS" hereunder) as a polymer with a total of four kinds of substituent groups introduced into a cellulose skeleton, which are the two substituent groups of methyl ($-CH_3$) and hydroxypropyl ($-C_3H_6OH$) groups for forming an ether structure, and the two substituent groups of acetyl ($-COCH_3$) and succinyl ($-COC_2H_4COOH$) groups for forming an ester structure.

HPMCAS as an enteric polymer is widely used as a solid dispersion for improving elution of poorly water-soluble drugs, and as an enteric coating base.

An enteric coating preparation is one of major preparations that are widely used when administering a drug unstable to acids, and for the purpose of for example protecting the gastric mucosa. As a method for producing HPMCAS, there is known for example a production method where an esterification reaction is performed under the presence of sodium acetate as a catalyst, using acetic anhydride as an acetylating agent, succinic anhydride as a succinoylating agent and glacial acetic acid as an aliphatic carboxylic acid, and with a ratio (mass ratio) of glacial acetic acid to hydroxypropyl methylcellulose (also referred to as "HPMC" hereunder) being 2.2 (Publication number of Japanese translation of PCT international application JP 2017-505847A).

Further, there is also known a production method where an esterification reaction is performed under the presence of sodium acetate as a catalyst and in a kneader reactor equipped with multiple stirring blades capable of orbiting while rotating, using acetic anhydride as an acetylating agent, succinic anhydride as a succinoylating agent and glacial acetic acid as an aliphatic carboxylic acid, and with a ratio (mass ratio) of glacial acetic acid to HPMC being 1.6 (JP-A-2021-070789).

SUMMARY OF THE INVENTION

As described in Publication number of Japanese translation of PCT international application JP 2017-505847A, when producing HPMCAS, as a result of increasing the amount of the aliphatic carboxylic acid, while the viscosity of a reaction solution in the synthesis process can be lowered, production efficiency cannot be raised as the amount of HPMC added per batch will thus be limited. Meanwhile, a solvent quantity can be reduced by reducing the amount of the aliphatic carboxylic acid used, whereby the added amount of HPMC can be increased by such quantity, and production efficiency can thus be raised; however, the problem is that as a result of reducing the amount of the aliphatic carboxylic acid, cellulose chains will react with one another so that the molecular weight of HPMCAS will be extremely high, and a HPMCAS solution will thus exhibit a high viscosity.

Further, in JP-A-2021-070789, it is disclosed that the viscosity of a HPMCAS solution can be adjusted by producing HPMCAS in a kneader reactor equipped with multiple stirring blades capable of orbiting while rotating; however, since the usage of a reactor having a particular stirring mechanism is necessary, an existing reactor cannot be used as it is.

In this regard, there is demanded a method by which HPMCAS can be produced at a favorable productivity without modifying a reactor while inhibiting an increase in molecular weight that is associated with a reduction in the amount of an aliphatic carboxylic acid. The present invention was made in view of the abovementioned situations, and it is an object of the present invention to provide a method capable of productively producing, even after reducing the amount of an aliphatic carboxylic acid used, HPMCAS with an equivalent level of molecular weight as compared to before reducing the amount of the aliphatic carboxylic acid.

The inventor of the present invention diligently conducted a series of studies to achieve the above object, and completed the invention as follows. That is, the inventor found that in a reaction step of producing HPMCAS, by subjecting HPMC, an acetylating agent and a succinoylating agent to an esterification reaction under the presence of an aliphatic carboxylic acid and a polyalcohol, HPMCAS can be synthesized with a reduced amount of an aliphatic carboxylic acid, but without increasing the molecular weight of HPMCAS, thus improving a production efficiency per one batch.

In one mode of the present invention, there is provided a method for producing hydroxypropyl methylcellulose acetate succinate, that includes at least an esterification reaction step of obtaining a hydroxypropyl methylcellulose acetate succinate-containing reaction solution by subjecting hydroxypropyl methylcellulose, an acetylating agent and a succinoylating agent to an esterification reaction under the presence of an aliphatic carboxylic acid and a polyalcohol.

Further, the present invention is to provide the following methods for producing hydroxypropyl methylcellulose acetate succinate.

[1]
A method for producing hydroxypropyl methylcellulose acetate succinate, comprising at least
an esterification reaction step of obtaining a hydroxypropyl methylcellulose acetate succinate-containing reaction solution by subjecting hydroxypropyl methylcellulose, an acetylating agent and a succinoylating agent to an esterification reaction under the presence of an aliphatic carboxylic acid and a polyalcohol.

[2]
The method for producing hydroxypropyl methylcellulose acetate succinate according to [1], further comprising, in addition to the esterification reaction step, at least
a precipitation step of obtaining a suspension with hydroxypropyl methylcellulose acetate succinate precipitated, by mixing the reaction solution and water; and
steps of washing, deliquoring and drying hydroxypropyl methylcellulose acetate succinate in the suspension.

[3]
The method for producing hydroxypropyl methylcellulose acetate succinate according to [1] or [2], wherein a mass ratio between the aliphatic carboxylic acid and hydroxypropyl methylcellulose (aliphatic carboxylic acid/hydroxypropyl methylcellulose) is 1.1 to 1.5.

[4]

The method for producing hydroxypropyl methylcellulose acetate succinate according to any one of [1] to [3], wherein the polyalcohol is at least one of a sugar alcohol, glycerin or an alkylene glycol.

According to the present invention, when producing HPMCAS, the amount of HPMC added into a reactor can be increased without increasing the molecular weight of HPMCAS even when using a reduced amount of an aliphatic carboxylic acid. In this way, HPMCAS with an equivalent level of molecular weight as a conventional one can be produced at a favorable productivity without having to employ a large-sized or modified reactor. Further, there are no polyalcohols and/or esterified polyalcohols remaining in HPMCAS.

DETAILED DESCRIPTION OF THE INVENTION

Figure 1:
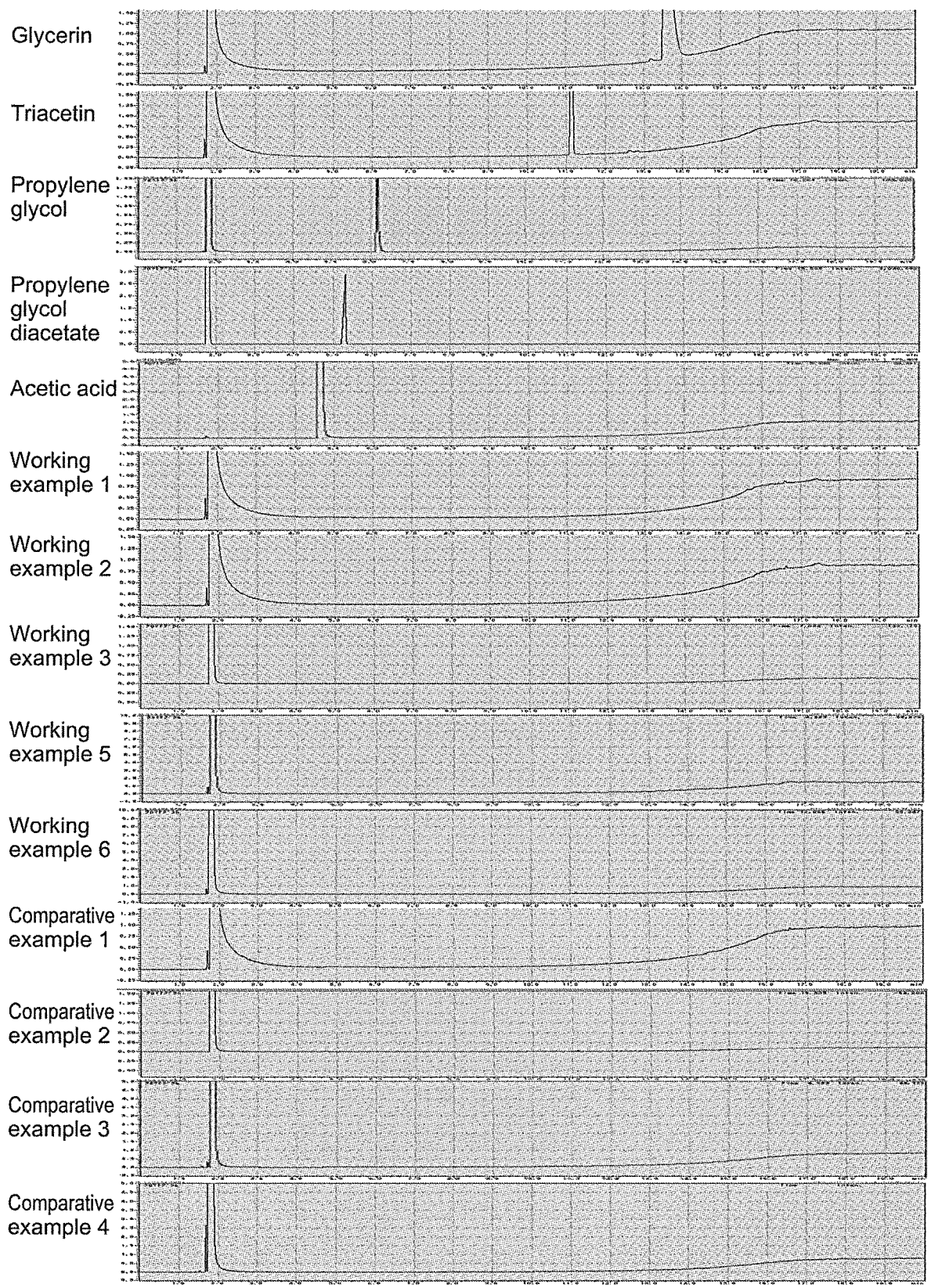
FIG. 1 shows results of analyses performed by a gas chromatograph on an ethanol extraction liquid of HPMCAS of each of working examples 1, 2, 3, 5 and 6 and comparative examples; along with results of analyses performed by a gas chromatograph on glycerin, triacetin, propylene glycol, propylene glycol diacetate and acetic acid, for comparison.

At first, described is an esterification reaction step of obtaining a HPMCAS-containing reaction solution by subjecting HPMC, an acetylating agent and a succinoylating agent to an esterification reaction under the presence of an aliphatic carboxylic acid and a polyalcohol.

HPMC is a non-ionic water-soluble cellulose ether. In terms of obtaining HPMC with a small number of insoluble fibers, a degree of substitution (DS) of the methoxy groups in HPMC is preferably 0.73 to 2.83, more preferably 1.25 to 2.37, even more preferably 1.60 to 2.00. In terms of obtaining HPMC with a small number of insoluble fibers, a molar substitution number (MS) of the hydroxypropoxy groups is preferably 0.10 to 1.90, more preferably 0.12 to 0.95, even more preferably 0.15 to 0.65.

The insoluble fibers are parts contained in HPMC that are insoluble in water. As described later, HPMC exhibits a water solubility after having the hydroxyl groups in cellulose partially etherified, and thereby weakening the hydrogen bonds in the intra-molecule and inter-molecule of cellulose. Since it is industrially difficult to perform etherification in a perfectly uniform manner, HPMC may contain parts that are insoluble in water i.e., the insoluble fibers due to an insufficient degree of substitution of ether groups, or an ununiform substitution of the ether groups. If HPMCAS contains a large number of the insoluble fibers, the yield of an enteric coating preparation will decrease due to an ununiform enteric film, or productivity will decline as filter clogging will frequently occur in a filtration step of a coating solution; it is preferred that HPMC as a raw material of HPMCAS have a small number of the insoluble fibers. The number of the insoluble fibers may for example be obtained by analyzing a HPMC aqueous solution with the aid of a device such as Coulter counter.

The degree of substitution (DS) of the methoxy groups refers to a substitution degree i.e., an average number of methoxy groups per 1 anhydroglucose unit. The molar substitution number (MS) of the hydroxypropoxy groups refers to an average molar number of hydroxypropoxy groups per 1 mol unit of anhydroglucose. The degree of substitution (DS) of the methoxy groups in HPMC and the molar substitution number (MS) of the hydroxypropoxy groups therein can be obtained by measuring the contents of the methoxy and hydroxypropoxy groups, and then converting the results obtained, via a method described in the section "Hypromellose" of The Japanese Pharmacopoeia 18th edition.

In terms of kneadability in the esterification step, it is preferred that a 2% by mass aqueous solution of HPMC at 20° C. have a viscosity of 1.5 to 30.0 mPa s, more preferably 2.0 to 20.0 mPa s, even more preferably 2.5 to 15.0 mPa s.

The viscosity of the 2% by mass aqueous solution of HPMC at 20° C. can be measured according to the method "Viscosity measurement by capillary tube viscometer" under "Viscosity Determination" described in "General Tests, Processes and Apparatus" of Japanese Pharmacopoeia 18th edition.

As HPMC, there may be used one produced by a known method, or one that is commercially available. HPMC may for example be prepared in such a manner where a solution of an alkali metal hydroxide such as sodium hydroxide and potassium hydroxide is at first brought into contact with a sheet-, chip- or powder-like pulp so as to obtain an alkali cellulose, followed by adding an etherifying agent such as methyl chloride and propylene oxide to react the same.

Although there are no particular limitations on the alkali metal hydroxide solution so long as an alkali cellulose can be obtained, preferred is an aqueous solution of sodium hydroxide or potassium hydroxide from an economical perspective. Further, in terms of stabilizing the composition of the alkali cellulose and securing the transparency of the cellulose ether, it is preferred that the alkali metal hydroxide solution have a concentration of 23 to 60% by mass, more preferably 35 to 55% by mass.

After producing the alkali cellulose, an etherifying agent such as methyl chloride and propylene oxide is added to perform an etherification reaction by a common method, whereafter steps such as a washing, a deliquoring, a drying, a crushing and a depolymerizing step are carried out as necessary to obtain HPMC.

Examples of the aliphatic carboxylic acid include aliphatic carboxylic acids having 2 to 4 carbon atoms, such as acetic acid, propionic acid and butyric acid; acetic acid is preferred from an economical perspective.

From the perspectives of reaction efficiency of esterification, viscosity of the reaction solution, and molecular weight of the HPMCAS obtained, the aliphatic carboxylic acid is used in such an amount that a mass ratio thereof to the mass of HPMC (mass of aliphatic carboxylic acid/mass of HPMC) is preferably 1.0 to 2.0, more preferably 1.1 to 1.8, even more preferably 1.1 to 1.5. An excessively large amount of the aliphatic carboxylic acid will lead to a low reaction efficiency of esterification; an excessively small amount of the aliphatic carboxylic acid is not preferable from an economical perspective as there will have to be added a significantly large amount of a polyalcohol that is needed to restrict an increase in the molecular weight of HPMCAS. The effect of restricting the increase in the molecular weight by adding a polyalcohol is particularly high when the aliphatic carboxylic acid is used in a small amount e.g., when the abovementioned mass ratio is 1.1 to 1.5.

Examples of the polyalcohol may include a sugar alcohol such as sorbitol; glycerin; and an alkylene glycol such as propylene glycol. In terms of, for example, safety and ease in removing by-products, preferred are sorbitol, glycerin and propylene glycol, more preferred are glycerin and propylene glycol, even more preferred is glycerin.

In terms of molecular weight control of HPMCAS and esterification efficiency, the polyalcohol is preferably used in an amount of 0.01 to 0.30 mol, more preferably 0.02 to 0.26 mol, even more preferably 0.03 to 0.22 mol, per 1 mol of HPMC.

In terms of restricting the increase in the molecular weight of HPMCAS, it is preferred that the polyalcohol be added ahead of the acetylating agent and the succinoylating agent.

Examples of the acetylating agent include acetic anhydride and acetyl chloride; from an economical perspective, acetic anhydride is preferred.

In terms of degree of substitution and yield of HPMCAS obtained, the acetylating agent is preferably used in an amount of 0.2 to 1.8 mol, more preferably 0.4 to 1.7 mol, even more preferably 0.6 to 1.6 mol, per 1 mol of HPMC.

Examples of the succinoylating agent include succinic anhydride and succinyl chloride; from an economical perspective, succinic anhydride is preferred.

In terms of degree of substitution and yield of HPMCAS obtained, the succinoylating agent is preferably used in an amount of 0.1 to 1.0 mol, more preferably 0.1 to 0.8 mol, even more preferably 0.3 to 0.5 mol, per 1 mol of HPMC.

The esterification reaction may be performed under the presence of a catalyst. From an economical perspective, the catalyst is preferably an alkali metal carboxylate such as sodium acetate. As appropriate, one kind of catalyst may be used alone, or two or more kinds thereof may be used in combination. Further, a commercially available catalyst(s) may be used.

In terms of degree of substitution and yield, the catalyst is preferably used in an amount of 0.8 to 1.5 mol, more preferably 0.9 to 1.1 mol, per 1 mol of HPMC.

HPMCAS-containing reaction solution may for example be obtained by a method where the polyalcohol, acetylating agent and succinoylating agent as well as, if needed, the catalyst are to be added to a solution prepared by dissolving HPMC in an aliphatic carboxylic acid. There are no particular restrictions on a method for adding the acetylating agent and the succinoylating agent. However, the succinyl groups generated by the reaction between the succinoylating agent and HPMC will then react with another HPMC, which will presumably cause the molecules to crosslink and the molecular weight of HPMCAS to thus increase. In this way, in terms of restricting an excessive increase of the molecular weight, it is preferred that the succinoylating agent be not added in a whole amount at the start of the reaction, but added in two or more parts.

For esterification reaction, there may be used a twin-shaft mixer suitable for uniformly mixing a high-viscosity fluid. Specifically, there may be used commercially marketed devices such as those called kneader and internal mixer.

In terms of optimization of reaction speed or reaction solution viscosity, a reaction temperature in the esterification reaction step is preferably 60 to 100° C., more preferably 80 to 90° C. Further, in terms of yield or productivity, a reaction time in the esterification reaction step is preferably 2 to 8 hours, more preferably 3 to 6 hours.

After the esterification reaction is over, water may be added to the reaction solution if necessary for the purposes of treating the unreacted acetic anhydride and succinic anhydride, and adjusting the viscosity of the reaction solution. Water is added in such an amount that a mass ratio thereof to the mass of HPMC is preferably 0.8 to 1.5, more preferably 1.0 to 1.3.

In a precipitation step, the reaction solution obtained and water are mixed to obtain a suspension with HPMCAS precipitated. In terms of precipitation degree and treating time, water is mixed in such an amount that a mass ratio thereof to the mass of the suspension is preferably 3.3 to 8.5, more preferably 3.8 to 6.5. Here, if adding water after the esterification reaction as described above, water is mixed in the precipitation step in such an amount that a mass ratio thereof to the mass of the suspension is preferably 1.7 to 7.7, more preferably 2.5 to 5.5.

The temperature of the water mixed in the precipitation step is preferably 5 to 40° C., more preferably 5 to 30° C. Further, the temperature of the suspension immediately before being mixed with water in the precipitation step is preferably 10 to 40° C., more preferably 10 to 35° C., even more preferably 15 to 30° C. In order to have the temperature of the reaction solution immediately before coming into contact with water fall into these ranges, cooling may be conducted via a jacket of a reaction vessel.

HPMCAS precipitated may be washed, deliquored and dried, if necessary. In these washing, deliquoring and drying steps, washing is thoroughly performed with water to remove free acetic acid, free succinic acid and metallic salts thereof as well as remaining polyalcohols and esterified polyalcohols; deliquoring is performed by filtration using a sieve or the like; and drying is then performed at preferably 60 to 100° C., more preferably 70 to 80° C., for preferably 1 to 5 hours, more preferably 2 to 3 hours. HPMCAS with a high purity can thus be obtained.

The properties of HPMCAS obtained are described hereunder.

Degree of Substitution and Viscosity

The degree of substitution (DS) of the methoxy groups in HPMCAS is preferably 0.73 to 2.83, more preferably 1.25 to 2.37, even more preferably 1.60 to 2.00. The molar substitution number (MS) of the hydroxypropyl groups is preferably 0.10 to 1.90, more preferably 0.12 to 0.95, even more preferably 0.15 to 0.65. The degree of substitution (DS) of the acetyl groups is preferably 0.09 to 2.30, more preferably 0.18 to 1.07, even more preferably 0.20 to 0.80. The degree of substitution (DS) of the succinyl groups is preferably 0.07 to 1.78, more preferably 0.08 to 0.62, even more preferably 0.10 to 0.60.

Here, the DS of the methoxy groups, acetyl groups and succinyl groups in HPMCAS refer to substitution degrees i.e., an average number of methoxy groups per 1 anhydroglucose unit, an average number of acetyl groups per 1 anhydroglucose unit, and an average number of succinyl groups per 1 anhydroglucose unit; the MS of the hydroxypropoxy groups in HPMCAS refers to a molar substitution number i.e., an average molar number of hydroxypropoxy groups per 1 mol of anhydroglucose.

The degrees of substitution (DS) of the methoxy groups, acetyl groups and succinyl groups in HPMCAS, and the molar substitution number (MS) of the hydroxypropoxy groups therein, can be obtained by measuring the contents of the methoxy groups, acetyl groups, succinyl groups and hydroxypropoxy groups, and then converting the results obtained, via a method described in the section "Hypromellose Acetate Succinate" of The Japanese Pharmacopoeia 18th edition.

A 0.43% by mass sodium hydroxide aqueous solution containing 2% by mass of HPMCAS preferably has a viscosity of 1.0 to 10.0 mPa s, more preferably 1.5 to 5.0 mPa s, at 20° C. The viscosity of the 0.43% by mass sodium hydroxide aqueous solution containing 2% by mass of HPMCAS at 20° C. can be measured by a method described in the section "Hypromellose Acetate Succinate" of The Japanese Pharmacopoeia 18th edition.

As for the viscosity of an acetone solution containing 10% by mass of HPMCAS at 20° C., in terms of increasing the concentration of HPMCAS in the coating solution, it is preferred that such viscosity be not higher than 150 mPa·s, more preferably 10 to 100 mPa·s, even more preferably 10 to 80 mPa·s. The viscosity of the acetone solution containing 10% by mass of HPMCAS at 20° C. can be measured by the method "Viscosity measurement by capillary tube viscometer" described in the section "General Tests, Processes and Apparatus" of Japanese Pharmacopoeia 18th edition.

Molecular Weight (Mw, Mn) and Polydispersity

The weight average molecular weight (Mw), number average molecular weight (Mn) and polydispersity (Mw/Mn) of HPMCAS can be obtained by an absolute molecular weight measuring method combining a size exclusion chromatography (SEC) such as gel permeation chromatography (GPC) and multiangle light scattering (MALS) (e.g., Journal of Pharmaceutical and Biomedical Analysis 56 (2011) 743-748).

In terms of a balance between the concentration of HPMCAS in the enteric coating solution and the viscosity of such coating solution, Mw of HPMCAS is preferably 80,000 to 350,000 daltons, more preferably 80,000 to 300,000 daltons, even more preferably 80,000 to 280,000 daltons.

In terms of a balance between the concentration of HPMCAS in the enteric coating solution and the viscosity of such coating solution, Mn of HPMCAS is preferably 20,000 to 50,000 daltons, more preferably 22,000 to 48,000 daltons, even more preferably 25,000 to 45,000 daltons.

The polydispersity (Mw/Mn) of HPMCAS is preferably 3.8 to 8.0, more preferably 3.8 to 7.0, even more preferably 3.8 to 6.0.

The fact that polyalcohol-derived impurities are not contained in HPMCAS obtained by the method of the present invention can be confirmed by analyzing HPMCAS via gas chromatography, high-performance liquid chromatography or the like, HPMCAS analyzed being previously treated with an appropriate method.

Examples of the polyalcohol-derived impurities mainly include the remaining polyalcohols and esterified polyalcohols. The presence or non-presence of the remaining polyalcohols and esterified polyalcohols may for example be confirmed by dispersing HPMCAS in a solvent capable of dissolving polyalcohols and esterified polyalcohols, such as water or a monohydric alcohol e.g. ethanol; performing an extraction operation; and then conducting a gas chromatography analysis, a high-performance liquid chromatography analysis or the like to verify whether polyalcohols and esterified polyalcohols are contained in the solvent.

The fact that polyalcohols are not bonded to HPMCAS can be confirmed by respectively hydrolyzing HPMCAS in an acidic aqueous solution or a basic aqueous solution, and then analyzing the hydrolyzed solution via gas chromatography, high-performance liquid chromatography or the like.

WORKING EXAMPLES

The present invention is described in greater detail hereunder with reference to working and comparative examples; however, the invention shall not be limited to these working examples.

Working Example 1

Here, 910 g of glacial acetic acid was put into a 5 L horizontal kneader reactor (model PNV-5T by IRIE SHOKAI Co., Ltd.) equipped with a twin-shaft stirring blade (Z-type stirring blade for PNV-5T, material SUS316L, by IRIE SHOKAI Co., Ltd.). Next, there were added 700 g of HPMC whose DS of methoxy groups was 1.87, whose MS of hydroxypropoxy groups was 0.24, and whose 2% by mass aqueous solution had a viscosity of 3.4 mPa·s at 20° C.; 30.2 g of glycerin; 400 g of acetic anhydride; 68 g of succinic anhydride; and 306 g of sodium acetate. After stirring them at 85° C. and a stirring blade rotation number of 43 rpm for an hour, 68 g of succinic anhydride was added thereto, and stirring was then performed for another 4 hours to cause an esterification reaction.

Water was added to the obtained HPMCAS-containing reaction solution to stop the reaction, and there was gradually added thereto a water of a temperature of 20° C. and a mass 5.0 times larger than the mass of the reaction solution in terms of mass ratio, thus obtaining a suspension with HPMCAS precipitated. HPMCAS precipitated was then filtrated on an 80 mesh sieve to obtain a crude HPMCAS. The crude HPMCAS obtained was resuspended in a water of a temperature of 30° C. and a mass 20 times larger than the mass of the raw material HPMC; after performing stirring for 10 min, the resuspended and stirred product was then filtrated with an 80 mesh sieve. This operation involving resuspension, stirring and filtration was repeated 8 times to obtain a washed HPMCAS. Finally, drying was performed at 80° C. for 3 hours to obtain HPMCAS. Table 1 shows the reaction conditions in the esterification reaction step.

In order to determine the usefulness thereof when used for enteric coating, measured was the viscosity of an acetone solution containing 10% by mass of the obtained HPMCAS at 20° C. At first, 198.0 g of acetone was put into a glass bottle, and a stirring blade was then used to stir the same at a speed of 200 rpm for 5 min. Next, 22.0 g of HPMCAS was added thereto, and stirring was performed at the same speed for another 60 min before stopping; the viscosity of the acetone solution containing 10% by mass of the obtained HPMCAS at 20° C. was measured by an Ubbelohde viscometer, in accordance with the method "Viscosity measurement by capillary tube viscometer" described in the section "General Tests, Processes and Apparatus" of Japanese Pharmacopoeia 18th edition.

Table 2 shows the degrees of substitution in HPMCAS; the viscosity of the 0.43% by mass sodium hydroxide aqueous solution containing 2% by mass of HPMCAS at 20° C.; and the viscosity of the acetone solution containing 10% by mass of HPMCAS at 20° C. Molecular weight measurement method Here, 7.20 g of sodium dihydrogenphosphate, anhydrous (Guaranteed reagent by KANTO CHEMICAL CO., INC.) and 10.2 g of sodium nitrate (Guaranteed reagent by FUJI-FILM Wako Pure Chemical Corporation) were put into 1.2 L of a purified water. They were stirred at room temperature until completely dissolved so as to prepare an aqueous buffer. Next, 800 mL of acetonitrile (High Performance Liquid Chromatography grade, by KANTO CHEMICAL CO., INC.) was mixed with 1.2 L of the aqueous buffer; they were stirred at room temperature for 3 hours, followed by adding a 10M NaOH (by Sigma-Aldrich Co. LLC) thereto to adjust the pH to 8.0, and then using a 0.45 μm pore size hydrophilic PTFE (polytetrafluoroethylene) filter to filtrate the mixture so as to prepare a mobile phase.

HPMCAS was weighed and put into a glass vial, and the mobile phase of an amount corresponding to the mass of HPMCAS was then added, followed by using a magnetic stirrer to stir them at room temperature for 3 hours so as to prepare a 2 mg/mL HPMCAS solution. HPMCAS solution prepared was then passed through the 0.45 μm pore size hydrophilic PTFE syringe filter and used for measurement.

As a measurement device(s) for GPC, there was used one composed of Prominence, a HPLC system (by SHIMADZU CORPORATION); DAWN NEON, an 18-angle laser light scattering detector (by Wyatt Technology Corporation); and OPTILABrex NEON differential refractive index detector (by Wyatt Technology Corporation). As a column for analysis, TSK-GEL (registered trademark) $GMPW_{XL}$ (300×7.8 mm) (by Tosoh Corporation) was used, where the temperature of the column for analysis was set to 25±2° C., the differential refractive index detector was operated at 25° C., and the flow rate of the mobile phase was set to 0.5 mL/min; measurement of HPMCAS was conducted after carrying out device calibration where a 5 mg/mL solution of polyethylene oxide 20K (by Agilent Technologies) was used as a reference substance.

The data measured were analyzed with the Wyatt Astra 6 software (ver. 7.3.2.19 by Wyatt Technology Corporation) under a condition where dn/dc of HPMCAS=0.120 mL/g, thus obtaining the molecular weight (Mw, Mn) and polydispersity (Mw/Mn) of HPMCAS.

The measured results are shown in Table 2.

Impurity Analysis

Here, 1.0 g of HPMCAS was weighed and put into a glass vial, and 10.0 g of ethanol was then added thereto. A magnetic stirrer was used to stir them at room temperature for 6 hours so as to extract impurities soluble in ethanol. Solid-liquid separation was then performed by subjecting the ethanol dispersion of HPMCAS to centrifugal separation at 3,000 rpm for 5 min. A supernatant part was then passed through the 0.45 μm pore size hydrophilic PTFE syringe filter so as to be filtrated, thereby obtaining an ethanol extraction liquid of HPMCAS.

Here, 1.0 g of HPMCAS was weighed into a glass vial, and 20.0 g of 5% by mass hydrochloric acid was then added thereto. A magnetic stirrer was used to stir them at 60° C. for 4 hours so as to acid-hydrolyze HPMCAS. The solution after the acid hydrolysis was then cooled to room temperature, followed by neutralizing the solution with a 1 mol/L sodium hydroxide aqueous solution to such an extent that the pH thereof reached about 5.0. The neutralized dispersion was then subjected to centrifugal separation at 3,000 rpm for 5 min, followed by passing a supernatant part through the 0.45 μm pore size hydrophilic PTFE syringe filter to filtrate the same, thereby obtaining an acid hydrolysis solution of HPMCAS.

Here, 1.0 g of HPMCAS was weighed and put into a glass vial, and 20.0 g of a 1 mol/L sodium hydroxide aqueous solution was then added thereto. A magnetic stirrer was used to stir them at 60° C. for 4 hours so as to alkali-hydrolyze HPMCAS. The solution after the alkali hydrolysis was then cooled to room temperature, followed by neutralizing the solution with a 5% by mass hydrochloric acid to such an extent that the pH thereof reached about 7.0. The neutralized solution was then subjected to centrifugal separation at 3,000 rpm for 5 min, followed by passing a supernatant part through the 0.45 μm pore size hydrophilic PTFE syringe filter to filtrate the same, thereby obtaining an alkali hydrolysis solution of HPMCAS.

For impurity analysis, Gas Chromatograph GC-2010 (by SHIMADZU CORPORATION) was used; as a column for analysis, DB-WAX (column length 30 m, column inner diameter 0.25 mm, capillary thickness 0.25 μm, by Agilent Technologies) was used. Helium was used as a carrier gas, and the carrier gas was flowed under a constant flow rate mode of 35 cm/s. A sample injection volume was set to 1 μL, the temperature at the sample injection inlet was set to 250° C., and a sample was introduced into the column at a split ratio 20:1. As for a column oven, the temperature thereof was maintained at 100° C. for 1 min, and was then raised to 250° C. at a rate of 10° C./min, after which the temperature was maintained at 250° C. for 4 min. The sample that had passed through the column for analysis was detected by a flame ionization detector (FID) whose temperature was set to 250° C.

Figure 2:
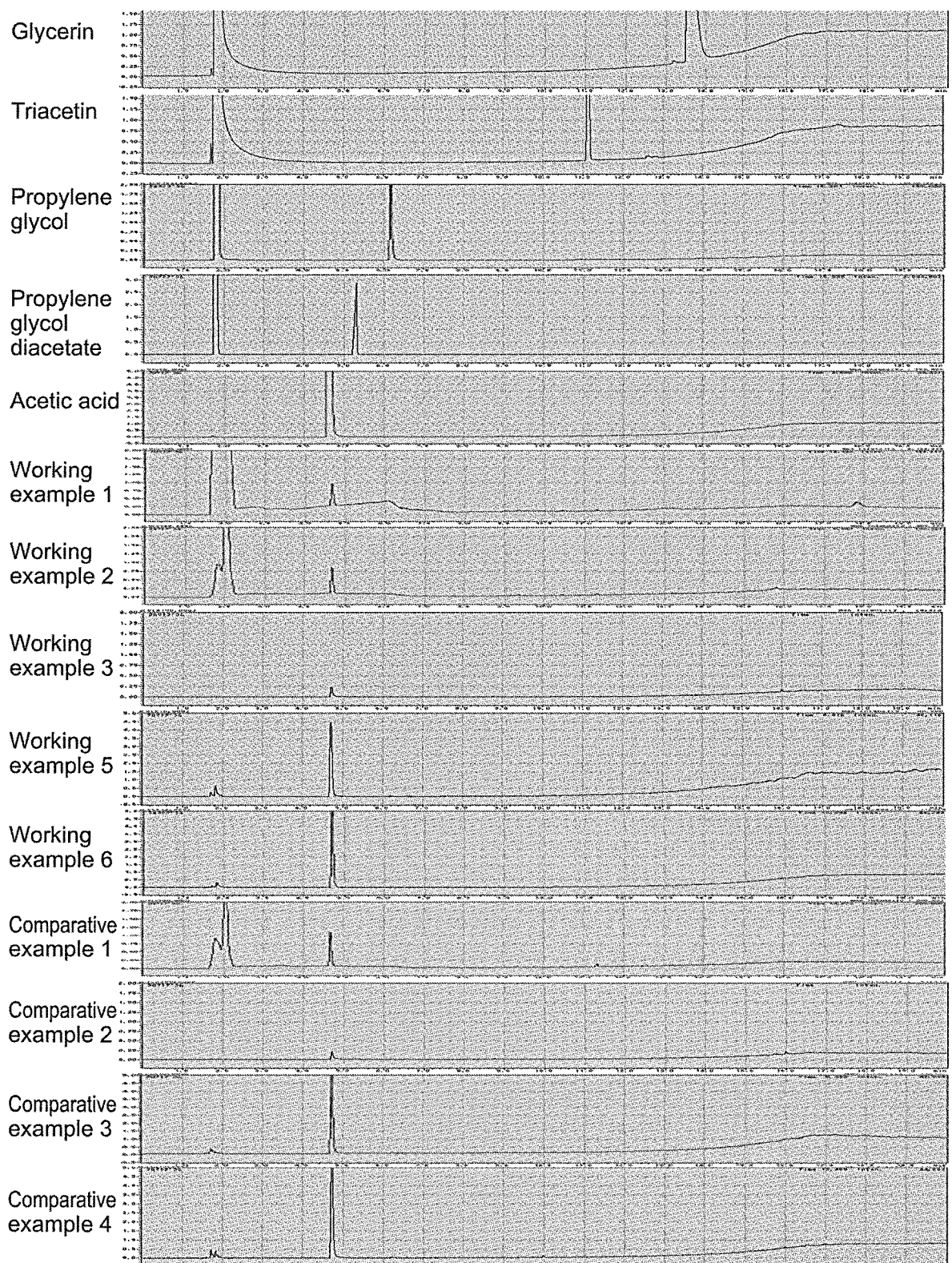
FIG. 2 shows results of analyses performed by a gas chromatograph on an acid hydrolysis solution of HPMCAS of each of the working examples 1, 2, 3, 5 and 6 and the comparative examples; along with results of analyses performed by a gas chromatograph on glycerin, triacetin, propylene glycol, propylene glycol diacetate and acetic acid, for comparison.
Figure 3:
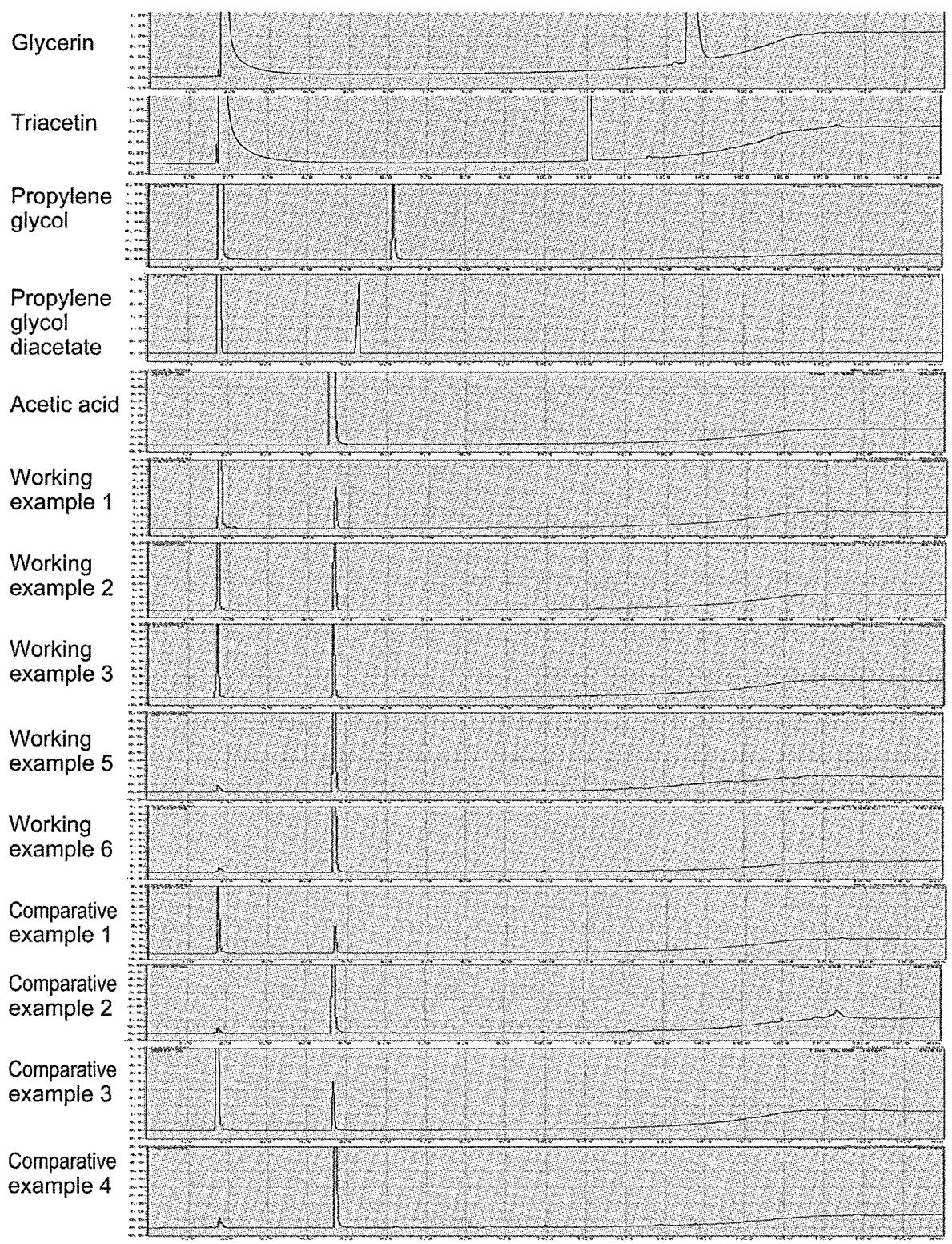
FIG. 3 shows results of analyses performed by a gas chromatograph on an alkali hydrolysis solution of HPMCAS of each of the working examples 1, 2, 3, 5 and 6 and the comparative examples; along with results of analyses performed by a gas chromatograph on glycerin, triacetin, propylene glycol, propylene glycol diacetate and acetic acid, for comparison.

The ethanol extraction liquid, acid hydrolysis solution and alkali hydrolysis solution of HPMCAS were each analyzed via gas chromatography. FIGS. 1 to 3 show the analysis results of gas chromatography performed on each of the ethanol extraction liquid, acid hydrolysis solution and alkali hydrolysis solution of HPMCAS, along with the analysis results of gas chromatography performed on glycerin as a polyalcohol, triacetin as an esterified polyalcohol, and acetic acid generated by hydrolysis of acetyl groups, for comparison. The peaks of glycerin and an esterified glycerin such as triacetin were not detected in the gas chromatograms of the working example 1 as shown in FIGS. 1 to 3; it was confirmed that polyalcohols and esterified polyalcohols had been able to be eliminated by the washing operation, and that no polyalcohols were bonded to HPMCAS.

The results of the impurity analysis via gas chromatography were handled in such a manner that an evaluation "Not detected" was given when peaks of polyalcohols and esterified polyalcohols were not confirmed, whereas an evaluation "Detected" was given when these peaks were each confirmed; the evaluation results are shown in Table 3.

Working Example 2

HPMCAS was obtained by carrying out similar operations as the working example 1, except that when synthesizing HPMCAS, there were used 770 g of glacial acetic acid, 45.3 g of glycerin, 423 g of acetic anhydride, and 69 g of succinic anhydride per each time of addition. Table 1 shows the reaction conditions in the esterification reaction step; Table 2 shows the degrees of substitution in HPMCAS obtained, the viscosity of the 0.43% by mass sodium hydroxide aqueous solution containing 2% by mass of HPMCAS at 20° C., the viscosity of the acetone solution containing 10% by mass of HPMCAS at 20° C., and the results of molecular weight measurement; and FIGS. 1 to 3 and Table 3 show the results of the impurity analysis along with the comparative analysis results of gas chromatography performed on glycerin as a polyalcohol, triacetin as an esterified polyalcohol, and acetic acid generated by hydrolysis of acetyl groups.

Working Example 3

HPMCAS was obtained by carrying out similar operations as the working example 1, except that the polyalcohol used when synthesizing HPMCAS was changed to propylene glycol, and it was added in an amount of 37.8 g. Table 1 shows the reaction conditions in the esterification reaction step; Table 2 shows the degrees of substitution in HPMCAS obtained, the viscosity of the 0.43% by mass sodium hydroxide aqueous solution containing 2% by mass of HPMCAS at 20° C., the viscosity of the acetone solution containing 10% by mass of HPMCAS at 20° C., and the results of molecular weight measurement; and FIGS. 1 to 3 and Table 3 show the results of the impurity analysis along with the comparative analysis results of gas chromatography performed on propylene glycol as a polyalcohol, propylene glycol diacetate as an esterified polyalcohol, and acetic acid generated by hydrolysis of acetyl groups.

Working Example 4

HPMCAS was obtained by carrying out similar operations as the working example 1, except that the polyalcohol used when synthesizing HPMCAS was changed to sorbitol. Table 1 shows the reaction conditions in the esterification reaction step; and Table 2 shows the degrees of substitution in HPMCAS obtained, the viscosity of the 0.43% by mass sodium hydroxide aqueous solution containing 2% by mass of HPMCAS at 20° C., the viscosity of the acetone solution containing 10% by mass of HPMCAS at 20° C., and the results of molecular weight measurement.

Since analysis by gas chromatography is difficult due to the high boiling point of sorbitol, a high-performance liquid chromatograph was employed for the impurity analysis in the working example 4. Prominence, a HPLC system (by SHIMADZU CORPORATION) was used as a liquid feeding unit; Rezex RCM-Monosaccharide $Ca^{+2}$ (8%) (300×7.8 mm) (by Phenomenex Inc.) was used as a column for analysis; and RID-10A (by SHIMADZU CORPORATION) was used as a differential refractive index detector. Measurement was conducted with the temperature of the column for analysis being set to 85±2° C., the differential refractive index detector being operated at 40° C., and the flow rate of a mobile phase being set to 0.5 mL/min, where a distilled water was used as the mobile phase.

Figure 4:
FIG. 4 shows results of analyses performed by a high-performance liquid chromatograph on an ethanol extraction liquid, acid hydrolysis solution and alkali hydrolysis solution of HPMCAS of a working example 4; along with results of analyses performed by a high-performance liquid chromatograph on sorbitol, ethanol (extraction solvent), acetic acid, succinic acid and sodium chloride (generated by a neutralization step after hydrolysis), for comparison.

The ethanol extraction liquid, acid hydrolysis solution and alkali hydrolysis solution of HPMCAS were each analyzed via high-performance liquid chromatography. FIG. 4 shows the analysis results of high-performance liquid chromatography performed on the ethanol extraction liquid, acid hydrolysis solution and alkali hydrolysis solution of HPMCAS, along with the analysis results of high-performance liquid chromatography performed on sorbitol as a polyalcohol, ethanol as an extraction solvent, acetic acid generated by hydrolysis of acetyl groups, succinic acid generated by hydrolysis of succinyl groups, and sodium chloride generated by an neutralization operation after hydrolysis, for comparison (chromatogram of an esterified polyalcohol is not shown as an esterified water-soluble sorbitol was not commercially available). The peak of sorbitol was not detected in the high-performance liquid chromatograms of the working example 4 as shown in FIG. 4; it was confirmed that polyalcohols and esterified polyalcohols had been able to be eliminated by the washing operation, and that no polyalcohols were bonded to HPMCAS.

The results of the impurity analysis via high-performance liquid chromatography were handled in such a manner that an evaluation "Not detected" was given when peaks of polyalcohols were not confirmed, whereas an evaluation "Detected" was given when these peaks were each confirmed; the evaluation results are shown in Table 3.

Working Example 5

HPMCAS was obtained by carrying out similar operations as the working example 1, except that when synthesizing HPMCAS, there were used 560 g of acetic anhydride, and 48 g of succinic anhydride per each time of addition. Table 1 shows the reaction conditions in the esterification reaction step; Table 2 shows the degrees of substitution in HPMCAS obtained, the viscosity of the 0.43% by mass sodium hydroxide aqueous solution containing 2% by mass of HPMCAS at 20° C., the viscosity of the acetone solution containing 10% by mass of HPMCAS at 20° C., and the results of molecular weight measurement; and FIGS. 1 to 3 and Table 3 show the results of the impurity analysis along with the comparative analysis results of gas chromatography performed on glycerin as a polyalcohol, triacetin as an esterified polyalcohol, and acetic acid generated by hydrolysis of acetyl groups.

Working Example 6

HPMCAS was obtained by carrying out similar operations as the working example 1, except that when synthesizing HPMCAS, there were used 410 g of acetic anhydride, and 114 g of succinic anhydride per each time of addition. Table 1 shows the reaction conditions in the esterification reaction step; Table 2 shows the degrees of substitution in HPMCAS obtained, the viscosity of the 0.43% by mass sodium hydroxide aqueous solution containing 2% by mass of HPMCAS at 20° C., the viscosity of the acetone solution containing 10% by mass of HPMCAS at 20° C., and the results of molecular weight measurement; and FIGS. 1 to 3 and Table 3 show the results of the impurity analysis along with the comparative analysis results of gas chromatography performed on glycerin as a polyalcohol, triacetin as an esterified polyalcohol, and acetic acid generated by hydrolysis of acetyl groups.

Comparative Example 1

HPMCAS was obtained by carrying out similar operations as the working example 1, except that when synthesizing HPMCAS, there were used 1,120 g of glacial acetic acid, 354 g of acetic anhydride, and 62 g of succinic anhydride per each time of addition, with no glycerin being added. Table 1 shows the reaction conditions in the esterification reaction step; Table 2 shows the degrees of substitution in HPMCAS obtained, the viscosity of the 0.43% by mass sodium hydroxide aqueous solution containing 2% by mass of HPMCAS at 20° C., the viscosity of the acetone solution containing 10% by mass of HPMCAS at 20° C., and the results of molecular weight measurement; and FIGS. 1 to 3 and Table 3 show the results of the impurity analysis.

Comparative Example 2

HPMCAS was obtained by carrying out similar operations as the working example 1, except that when synthesizing HPMCAS, there was used 910 g of glacial acetic acid with no glycerin being added. Table 1 shows the reaction conditions in the esterification reaction step; Table 2 shows the degrees of substitution in HPMCAS obtained, the viscosity of the 0.43% by mass sodium hydroxide aqueous solution containing 2% by mass of HPMCAS at 20° C., the viscosity of the acetone solution containing 10% by mass of HPMCAS at 20° C., and the results of molecular weight measurement; and FIGS. 1 to 3 and Table 3 show the results of the impurity analysis.

Comparative Example 3

HPMCAS was obtained by carrying out similar operations as the comparative example 1, except that when synthesizing HPMCAS, there were used 508 g of acetic anhydride, and 41 g of succinic anhydride per each time of addition. Table 1 shows the reaction conditions in the esterification reaction step; Table 2 shows the degrees of substitution in HPMCAS obtained, the viscosity of the 0.43% by mass sodium hydroxide aqueous solution containing 2% by mass of HPMCAS at 20° C., the viscosity of the acetone solution containing 10% by mass of HPMCAS at 20° C., and the results of molecular weight measurement; and FIGS. 1 to 3 and Table 3 show the results of the impurity analysis.

Comparative Example 4

HPMCAS was obtained by carrying out similar operations as the comparative example 1, except that when synthesizing HPMCAS, there were used 373 g of acetic anhydride, and 97 g of succinic anhydride per each time of addition. Table 1 shows the reaction conditions in the esterification reaction step; Table 2 shows the degrees of substitution in HPMCAS obtained, the viscosity of the 0.43% by mass sodium hydroxide aqueous solution containing 2% by mass of HPMCAS at 20° C., the viscosity of the acetone solution containing 10% by mass of HPMCAS at 20° C., and the results of molecular weight measurement; and FIGS. 1 to 3 and Table 3 show the results of the impurity analysis.

TABLE 1

| | HPMC | | Glacial acetic acid | | | Acetic anhydride | | Succinic anhydride (total amount) | | Sodium acetate | | Polyalcohol | | |
|---|---|---|---|---|---|---|---|---|---|---|---|---|---|---|
| | g | mol | g | mol | Mass ratio to HPMC* | g | mol | g | mol | g | mol | Type | g | mol |
| Working example 1 | 700 | 3.46 | 910 | 15.2 | 1.3 | 400 | 3.89 | 136 | 1.36 | 306 | 3.73 | Glycerin | 30.2 | 0.328 |
| Working example 2 | 700 | 3.46 | 770 | 12.8 | 1.1 | 423 | 4.11 | 138 | 1.38 | 306 | 3.73 | Glycerin | 45.3 | 0.492 |
| Working example 3 | 700 | 3.46 | 910 | 15.2 | 1.3 | 400 | 3.89 | 136 | 1.36 | 306 | 3.73 | Propylene glycol | 37.8 | 0.497 |
| Working example 4 | 700 | 3.46 | 910 | 15.2 | 1.3 | 400 | 3.89 | 136 | 1.36 | 306 | 3.73 | Sorbitol | 30.2 | 0.166 |
| Working example 5 | 700 | 3.46 | 910 | 15.2 | 1.3 | 560 | 5.44 | 96 | 0.96 | 306 | 3.73 | Glycerin | 30.2 | 0.328 |
| Working example 6 | 700 | 3.46 | 910 | 15.2 | 1.3 | 410 | 3.98 | 228 | 2.28 | 306 | 3.73 | Glycerin | 45.3 | 0.492 |
| Comparative example 1 | 700 | 3.46 | 1120 | 18.7 | 1.6 | 354 | 3.44 | 124 | 1.24 | 306 | 3.73 | — | 0 | 0 |
| Comparative example 2 | 700 | 3.46 | 910 | 15.2 | 1.3 | 400 | 3.89 | 136 | 1.36 | 306 | 3.73 | — | 0 | 0 |
| Comparative example 3 | 700 | 3.46 | 1120 | 18.7 | 1.6 | 508 | 4.94 | 82 | 0.82 | 306 | 3.73 | — | 0 | 0 |
| Comparative example 4 | 700 | 3.46 | 1120 | 18.7 | 1.6 | 373 | 3.62 | 194 | 1.94 | 306 | 3.73 | — | 0 | 0 |

*mass of aliphatic carboxylic acid/mass of HPMC

TABLE 2

| | Degree of substitution | | | | Viscosity* | Molecular weight | | | Acetone solution viscosity ** |
|---|---|---|---|---|---|---|---|---|---|
| | | | | | | Mw | Mn | Mw/Mn | |
| | $DS_{MeO}$ | $MS_{HPO}$ | $DS_{Ac}$ | $DS_{Suc}$ | mPa·s | kDa | kDa | — | mPa·s |
| Working example 1 | 1.87 | 0.24 | 0.52 | 0.28 | 3.03 | 132 | 31.7 | 4.16 | 38.8 |
| Working example 2 | 1.88 | 0.24 | 0.55 | 0.27 | 2.91 | 126 | 30.2 | 4.17 | 34.7 |
| Working example 3 | 1.88 | 0.24 | 0.55 | 0.28 | 2.91 | 128 | 30.9 | 4.15 | 36.2 |

TABLE 2-continued

| | Degree of substitution | | | | Viscosity* | Molecular weight | | | Acetone solution viscosity ** |
|---|---|---|---|---|---|---|---|---|---|
| | | | | | | Mw | Mn | Mw/Mn | |
| | $DS_{MeO}$ | $MS_{HPO}$ | $DS_{Ac}$ | $DS_{Suc}$ | mPa·s | kDa | kDa | — | mPa·s |
| Working example 4 | 1.88 | 0.24 | 0.56 | 0.28 | 3.00 | 116 | 29.8 | 3.89 | 32.9 |
| Working example 5 | 1.89 | 0.24 | 0.69 | 0.18 | 2.94 | 100 | 28.0 | 3.55 | 27.1 |
| Working example 6 | 1.89 | 0.24 | 0.48 | 0.42 | 2.98 | 216 | 41.7 | 5.18 | 55.6 |
| Comparative example 1 | 1.88 | 0.24 | 0.51 | 0.29 | 3.12 | 115 | 29.8 | 3.85 | 33.7 |
| Comparative example 2 | 1.87 | 0.24 | 0.54 | 0.29 | 3.03 | 576 | 117 | 4.92 | 196 |
| Comparative example 3 | 1.88 | 0.24 | 0.71 | 0.17 | 2.91 | 110 | 29.3 | 3.75 | 29.3 |
| Comparative example 4 | 1.91 | 0.25 | 0.47 | 0.41 | 3.01 | 204 | 36.5 | 5.59 | 53.7 |

*Viscosity refers to the viscosity of the 0.43% by mass sodium hydroxide aqueous solution containing 2% by mass of the HPMCAS at 20° C.
**Acetone solution viscosity refers to the viscosity of the acetone solution containing 10% by mass of the HPMCAS at 20° C.

TABLE 3

| | Ethanol extraction liquid | | Acid hydrolysis solution | | Alkali hydrolysis solution | |
|---|---|---|---|---|---|---|
| | Polyalcohol | Esterified polyalcohol | Polyalcohol | Esterified polyalcohol | Polyalcohol | Esterified polyalcohol |
| Working example 1 | Not detected | Not detected | Not detected | Not detected | Not detected | Not detected |
| Working example 2 | Not detected | Not detected | Not detected | Not detected | Not detected | Not detected |
| Working example 3 | Not detected | Not detected | Not detected | Not detected | Not detected | Not detected |
| Working example 4* | Not detected | — | Not detected | — | Not detected | — |
| Working example 5 | Not detected | Not detected | Not detected | Not detected | Not detected | Not detected |
| Working example 6 | Not detected | Not detected | Not detected | Not detected | Not detected | Not detected |
| Comparative example 1 | Not detected | Not detected | Not detected | Not detected | Not detected | Not detected |
| Comparative example 2 | Not detected | Not detected | Not detected | Not detected | Not detected | Not detected |
| Comparative example 3 | Not detected | Not detected | Not detected | Not detected | Not detected | Not detected |
| Comparative example 4 | Not detected | Not detected | Not detected | Not detected | Not detected | Not detected |

*Since an authentic sample suitable for analysis was not available, no analysis was conducted on an esterified polyalcohol.
*Analysis was conducted by high-performance liquid chromatography in the working example 4; other examples employed gas chromatography for analysis.

As shown by the results of the working examples 1 and 2, in the cases where HPMCAS was synthesized by adding glycerin, even when using a reduced amount of the aliphatic carboxylic acid (glacial acetic acid) as compared to the comparative example 1, there was obtained HPMCAS exhibiting equivalent levels of substitution degrees as HPMCAS of the comparative example 1; an equivalent level of viscosity at 20° C. as HPMCAS of the comparative example 1 when in the form of the 0.43% by mass sodium hydroxide aqueous solution containing 2% by mass of the corresponding HPMCAS; an equivalent level of molecular weight as HPMCAS of the comparative example 1; and an equivalent level of viscosity at 20° C. as HPMCAS of the comparative example 1 when in the form of the acetone solution containing 10% by mass of the corresponding HPMCAS. Further, since the various viscosities were at the equivalent level, it was confirmed that handling properties of HPMCAS solutions in an enteric coating operation were also at the equivalent level. Furthermore, by reducing the amount of the aliphatic carboxylic acid used in this way, the amount of HPMC added per one batch can be increased, whereby it is considered that this will lead to an improvement in production efficiency.

As shown by the results of the working examples 3 and 4, it was indicated that regardless of the type of polyalcohol, even in the cases where HPMCAS was synthesized by adding propylene glycol or sorbitol, the effects achieved were similar to those of the cases where glycerin was added.

As shown by the results of the working example 1 and comparative example 1, working example 5 and comparative example 3, and working example 6 and comparative example 4, it was confirmed that regardless of the substitution degrees in HPMCAS, by synthesizing HPMCAS under the coexistence of a polyalcohol, even after reducing the amount of the aliphatic carboxylic acid used, there could still be produced HPMCAS exhibiting the equivalent levels of properties as compared to before reducing the amount of the aliphatic carboxylic acid.

As shown by the result of the comparative example 2, it was confirmed that as a result of reducing the amount of the aliphatic carboxylic acid (glacial acetic acid) used without adding a polyalcohol, there were achieved a significantly high molecular weight and a significantly high viscosity at 20° C. when in the form of the acetone solution containing 10% by mass of HPMCAS, whereby the handling property of HPMCAS solution in the enteric coating operation deteriorated.

In this regard, it was confirmed that by synthesizing HPMCAS under the coexistence of a polyalcohol, even after reducing the amount of the aliphatic carboxylic acid used, there could still be produced, at a favorable productivity, HPMCAS exhibiting the equivalent levels of properties as compared to before reducing the amount of the aliphatic carboxylic acid.

What is claimed is:

1. A method for producing hydroxypropyl methylcellulose acetate succinate, comprising at least
    an esterification reaction step of obtaining a hydroxypropyl methylcellulose acetate succinate-containing reaction solution by subjecting hydroxypropyl methylcellulose, an acetylating agent and a succinoylating agent to an esterification reaction under the presence of an aliphatic carboxylic acid and a polyalcohol.

2. The method for producing hydroxypropyl methylcellulose acetate succinate according to claim 1, further comprising, in addition to the esterification reaction step, at least
    a precipitation step of obtaining a suspension with hydroxypropyl methylcellulose acetate succinate precipitated, by mixing the reaction solution and water; and
    steps of washing, deliquoring and drying hydroxypropyl methylcellulose acetate succinate in the suspension.

3. The method for producing hydroxypropyl methylcellulose acetate succinate according to claim 1, wherein a mass ratio between the aliphatic carboxylic acid and hydroxypropyl methylcellulose (aliphatic carboxylic acid/hydroxypropyl methylcellulose) is 1.1 to 1.5.

4. The method for producing hydroxypropyl methylcellulose acetate succinate according to claim 1, wherein the polyalcohol is at least one of a sugar alcohol, glycerin or an alkylene glycol.

5. The method for producing hydroxypropyl methylcellulose acetate succinate according to claim 2, wherein the polyalcohol is at least one of a sugar alcohol, glycerin or an alkylene glycol.

* * * * *